US012006081B2

(12) United States Patent
Risnes et al.

(10) Patent No.: US 12,006,081 B2
(45) Date of Patent: Jun. 11, 2024

(54) ADAPTABLE TOOLING METHODS, SYSTEM AND APPARATUSES

(71) Applicant: Delkor Systems, Inc., St. Paul, MN (US)

(72) Inventors: Scott C. Risnes, Burnsville, MN (US); Aaron J. Donlon, Redondo Beach, CA (US); Kevin Weiss, Stillwater, MN (US)

(73) Assignee: Delkor Systems, Inc., St. Paul, MN (US)

( * ) Notice: Subject to any disclaimer, the term of this patent is extended or adjusted under 35 U.S.C. 154(b) by 0 days.

(21) Appl. No.: 18/353,303

(22) Filed: Jul. 17, 2023

(65) Prior Publication Data

US 2023/0356870 A1 Nov. 9, 2023

Related U.S. Application Data

(63) Continuation of application No. 17/713,301, filed on Apr. 5, 2022, now Pat. No. 11,713,149, which is a continuation of application No. 16/852,077, filed on Apr. 17, 2020, now Pat. No. 11,292,629.

(60) Provisional application No. 62/835,095, filed on Apr. 17, 2019.

(51) Int. Cl.

*B65B 43/26* (2006.01)
*B31B 50/78* (2017.01)
*B31B 120/30* (2017.01)

(52) U.S. Cl.

CPC .......... *B65B 43/265* (2013.01); *B31B 50/784* (2017.08); *B31B 2120/302* (2017.08)

(58) Field of Classification Search

CPC ..... B65B 43/265; B31B 50/44; B31B 50/784; B31B 2100/002; B31B 2100/0024; B31B 2120/00; B31B 2120/302

USPC .......................................... 493/180, 183, 309

See application file for complete search history.

(56) References Cited

U.S. PATENT DOCUMENTS

| | | | | |
|---|---|---|---|---|
| 4,988,331 A * | 1/1991 | Boisseau | B31B 50/44 | 493/143 |
| 9,422,071 B2 * | 8/2016 | Adams | B65B 5/04 | |
| 2005/0137072 A1 * | 6/2005 | Jackson | B31B 50/00 | 493/171 |

(Continued)

FOREIGN PATENT DOCUMENTS

GB 955132 A 4/1964

OTHER PUBLICATIONS

Nov. 21, 2022 USPTO Office Action (U.S. Appl. No. 17/713,301).

*Primary Examiner* — Jacob A Smith

(74) *Attorney, Agent, or Firm* — Forsgren Fisher McCalmont DeMarea Tysver LLP; James M. Urzedowski; Daniel A. Tysver

(57) ABSTRACT

A modular case system and method of use provide for a case former having a base, interchangeable case gages and forming heads. Contained within the interior of the base are slide blocks mounted on slide rails and assemblies in such a manner as to allow the slide blocks to be slidingly reconfigured to form a case forming cavity of varicose sizes and shapes. The size and shape of the case forming cavity is established and maintained by a template opening, defined by, and potentially unique to, each case gage. The size and shape of the forming head corresponds to the size and shape of the template opening. The slide blocks are secured to the case gage by removable locking pins.

14 Claims, 21 Drawing Sheets

(56) References Cited

U.S. PATENT DOCUMENTS

| | | | | |
|---|---|---|---|---|
| 2015/0360801 | A1* | 12/2015 | Sytema | B65B 49/16 53/74 |
| 2016/0185065 | A1* | 6/2016 | Sytema | B31B 50/52 493/183 |
| 2020/0114611 | A1* | 4/2020 | Marsh | B31B 50/005 |

* cited by examiner

ADAPTABLE TOOLING METHODS, SYSTEM AND APPARATUSES

CROSS-REFERENCE TO RELATED CASES

This application is a continuation application claiming priority to U.S. application Ser. No. 17/713,301, filed on Apr. 5, 2022; which is in turn a continuation application of U.S. application Ser. No. 16/852,077, filed on Apr. 17, 2020 and issued as U.S. Pat. No. 11,292,629 on Apr. 5, 2022; which in turn claims priority to Provisional Application 62/835,095, filed on Apr. 17, 2019, the entire contents of which are incorporated herein by reference.

FIELD OF THE INVENTION

The present invention relates generally to a case former, and more particularly to the tooling of a case former, and its use, that may be readily adjusted in order to allow the case former to produce cases of various sizes and shapes.

BACKGROUND OF THE INVENTION

Many known case formers rely on a forming cavity, forming head and tooling to fold a case blank having a specific size and configuration into a corresponding case. Some case formers are capable of being reconfigured in order to allow the case former to produce cases of different sizes and shapes, but these known case formers rely on cumbersome mechanisms that are inefficient in terms of cost and use, prone to being misadjusted, and/or require constant monitoring to ensure they remain in alignment during use.

There is a need for a mechanism and system that will allow the size of the case forming cavity, and associated tooling, to be adjusted in order to allow the case former to be capable of producing different types of cases as desired by an operator. It is desirable that such a mechanism and system be comparatively less costly than those that are, easily and reliably repeatable for operational personnel, provides consistent results over time, and which has a high tolerance for material variations from suppliers.

Embodiments disclosed herein address this need by providing an adjustable case forming cavity having four, rail mounted, moveable corner slide blocks that can be easily reconfigured to accept various shapes and sizes of corrugated cardboard blanks so as to produce any of a wide variety of finished case configurations. The adjustable cavity is utilized with a customizable case gage that ensures each configuration of the corner slide blocks is precisely maintained throughout a forming run, thereby ensuring that cases are formed consistently. When a different case configuration is desired to be produced, the current case gage and forming head are removed, the corner blocks are reconfigured, and a new case gage and head that are tailored to the new blank are locked onto place over the reconfigured cavity, and the case former is ready to produces the new cases.

SUMMARY OF THE INVENTION

Embodiments shown and described herein are directed to a customizable case former, systems and methods of use. The case former includes a base that supports rail guided slide blocks that define the case forming cavity and provide it with a customizable shape. The case former also includes any number of potential case gages that are each uniquely configured to accept a particular size, shape and pattern of a case blank, which the case former folds and assembles into a particular style of case during its operation. Each case gage is provided with various guide mechanisms, and acts as a template to ensure the case forming cavity is properly sized and shaped to receive a particular blank necessary to form a corresponding particular type of case that is to be formed therefrom. Each case gage is accompanied by a customized forming head that is shaped to correspond to the opening size of the case forming cavity as defined by the case gage template.

By reconfiguring the slide blocks upon their respective rails, to match the template of a given case gage and forming head, the case former can be quickly and efficiently reconfigured to accept any of a variety of configurations of case blanks, and thereby produce a corresponding variety of configurations of cases with reliability and consistency.

These and other embodiments and their features are shown in the drawings and the following detailed description and claims.

DETAILED DESCRIPTION

Figure 1:
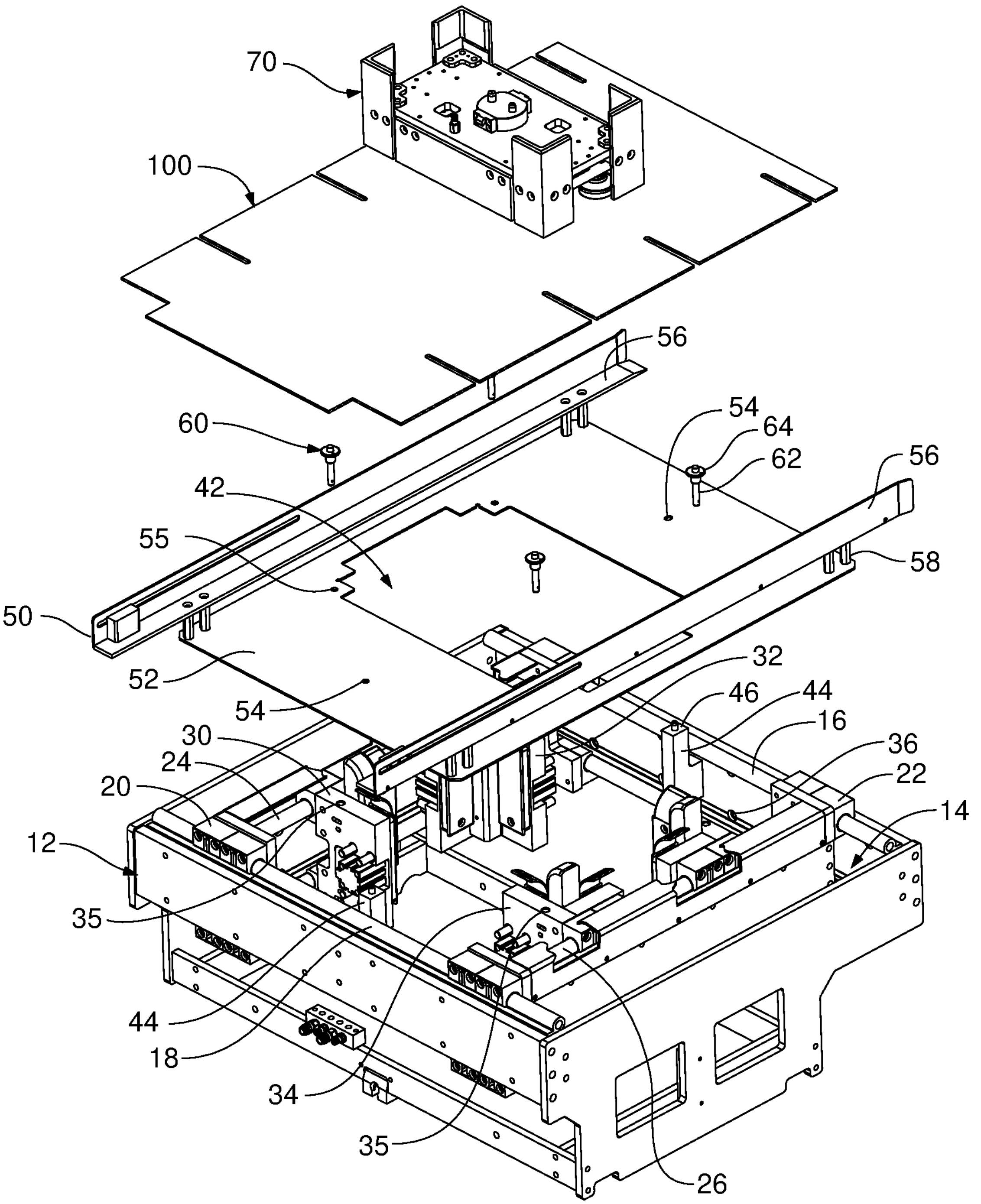
FIG. 1 is a exploded isometric view of an embodiment of the case former shown with a first type of case gage, forming head and blank in association with the case former base having slide blocks configured to define a first opening configuration of the case forming cavity.

As mentioned above, embodiments disclosed herein are directed to a customizable case former, and particularly to case former that can be quickly and efficiently converted from forming one type of case to another, and which will form cases with precision and consistency. An embodiment of such a case former and the primary elements that provide it with its customizable case forming functionality are shown in FIGS. 1-19. The methods of using such a case former, as well as the accompanying systems of employing customized forming heads and case gages with the case former are likewise illustrated in the drawings and described in greater detail below.

Starting with FIG. 1, a case former 10 is shown in an exploded view in order to reveal the various components that make up of the case former. As is shown, the case former 10, includes a case former base 12, which acts as a housing having an interior 14. Within the interior 14, and supported by the base 12 on opposing sides of the interior 14 are a first primary slide rail 16 and a second primary slide rail 18. The primary slide rails 16 and 18, support opposing first and second slide rail assemblies 20 and 22 respectively. The slide rail assemblies 20 and 22 are slidingly engaged and movable along the length of the primary slide rails 16 and 18 within the interior 14 of the base housing 12.

Each of the slide rail assemblies 20 and 22 support a secondary slide rails 24 and 26 respectively. For purposes of identification the secondary slide rails will be designated as a left secondary slide rail 24 and a right secondary slide rail 26. Slidingly mounted to the left secondary side rail 24 are a first pair of slide blocks 30 and 32. Slidingly mounted to the right secondary side rail 26 are a second pair of slide blocks 34 and 36. The four slide blocks 30, 32, 34, and 36 define the case forming cavity 40 of the case former, and by repositioning them along the secondary slide rails 24 and 26, and likewise, by repositioning the slide rail assemblies 20 and 22 along the primary slide rails 16 and 18, the case forming cavity 40 may be re-sized and re-shaped to any degree; limited only by the interior dimensions of the base housing 12.

Positioned above the base 12, the next primary component of the case former 10 is a case gage 50. The case gage 50 provides two key functions of the case former, namely, to act as a support and guide to the blanks 100 of corrugated cardboard (or other materials) that are fed into the case former and assembled into cases; and to secure the position of the slide blocks 30, 32, 34 and 36 in order to maintain the precise opening dimensions of the case forming cavity 100 that is necessary for the formation of a given type of case for the duration of a case forming run.

The primary component of the case gage 50 is the base plate 52, which acts as a template for guiding and holding the slide blocks 30, 32, 34, and 36 in a given position in order to establish the dimensions of the forming cavity 40 that is required for a given case assembly run. To accomplish this goal, each base plate 52 is provided with an opening 42 that has customized dimensions unique to a given case that is to be formed during the case forming process. The case forming process will be discussed in greater detail below, and is shown in FIGS. 16-19.

In order to properly act as a template, a case gage 50, must be properly positioned over the forming cavity 40 and secured to the base 12 before the case forming process begins. Returning to the base housing 12 for a moment, within the base interior 14 are two opposingly positioned, and fixed in place, bracing members 44. The bracing members 44 each have an upwardly protruding locating pin 46. Going back to case gage 50, the base plate 52 of the case cage 50 defines a pair of locating pin openings 54, that are sized and shaped to receive a locating pin 46 therethrough. The spacing and position of the locating pin openings 54 on every potential base plate 52 (and thus, every case gage 50) will be the same from one base plate to another. All of these components work together to provide a guide and securement mechanism whereby a case gage 50 is placed on top of the base 12 in such a manner so that each locating pin opening 54 receives one locating pin 46 therein. This provides an easily utilized, but precise mechanism to align and seat a case gage 50 on to the base 12.

While it is necessary to engage the case gage 50 to the base 12, it is also necessary to secure the case gage 50 to each of the slide blocks 30, 32, 34, and 36 if the base plate 52 is to properly act as a template for establishing and maintaining the proper size and shape of the forming cavity 40 through a given a case assembly run. To accomplish this, each base plate 50 defines four slide block alignment holes 55, each of which align with a slide block hole 35. Regardless of the type of base plate 52 and the size and shape of the template opening 42, the four slide block alignment holes 55 have the same position, relative to the template opening 42. This ensures that each case cage will fit onto the base 10 with consistency and precise alignment. The manner in which these holes are aligned and secured in place via the use of locking pins 60 is discussed in greater detail below and shown in FIGS. 9*a*-9*c*.

The locking pins 60 may be any sort of elongate fastener having a relatively narrow diameter post 62 as compared to a larger diameter head 64, such as in the manner of a screw, bolt, or pin.

As mentioned above, in addition to acting as the template for the dimensions of the forming cavity 40, the case gage 50, also is the guide and support mechanism for the blanks 100 that are to be formed into cases. As such in addition to the base plate 52, each case gage 50 will also include a pair of side guides 56 that are secured to and positioned above the base plate 52 by spacer 58. The spacers 58 provide the proper spacing between the case blank 100 and the forming cavity 40 during the forming process of a given case. Like the base plate opening 42, the various characteristics of the side guides 56 and spacers 58 are fully customizable depending on the type of blank 100 and the case being formed therefrom. Some of these characteristics as well as additional features of the side guides are discussed in greater detail below and shown in FIGS. 10-15.

The final primary component of note for providing the case former 10 with the capability of being convertible from forming one type of case to another is the forming head 70. In FIG. 1, a forming head 70 is shown that has external dimensions which correspond to the dimensions of the forming cavity 40, as imposed by the template opening 42 and whose corners are defined by the positions of the slide blocks 30, 32, 34, and 36. For each case gage 50 that has a unique template opening 42, a correspondingly shaped forming head 70 is provided. The precise relationship between the template opening 42 and forming head 70 are key elements that ensure that a given blank 100 is properly engaged by the slide blocks 30, 32, 34, and 36 during the case formation process, and that a given type of case will be formed with precision and repeatability.

The forming head 70 is otherwise a conventional forming head having the capability to selectively apply suction or vacuum to a surface, such as that of a blank 100 during the case forming process, in order to selectively hold the blank, and release the eventual case, to the surface of the forming head during the case forming process.

Figure 2:
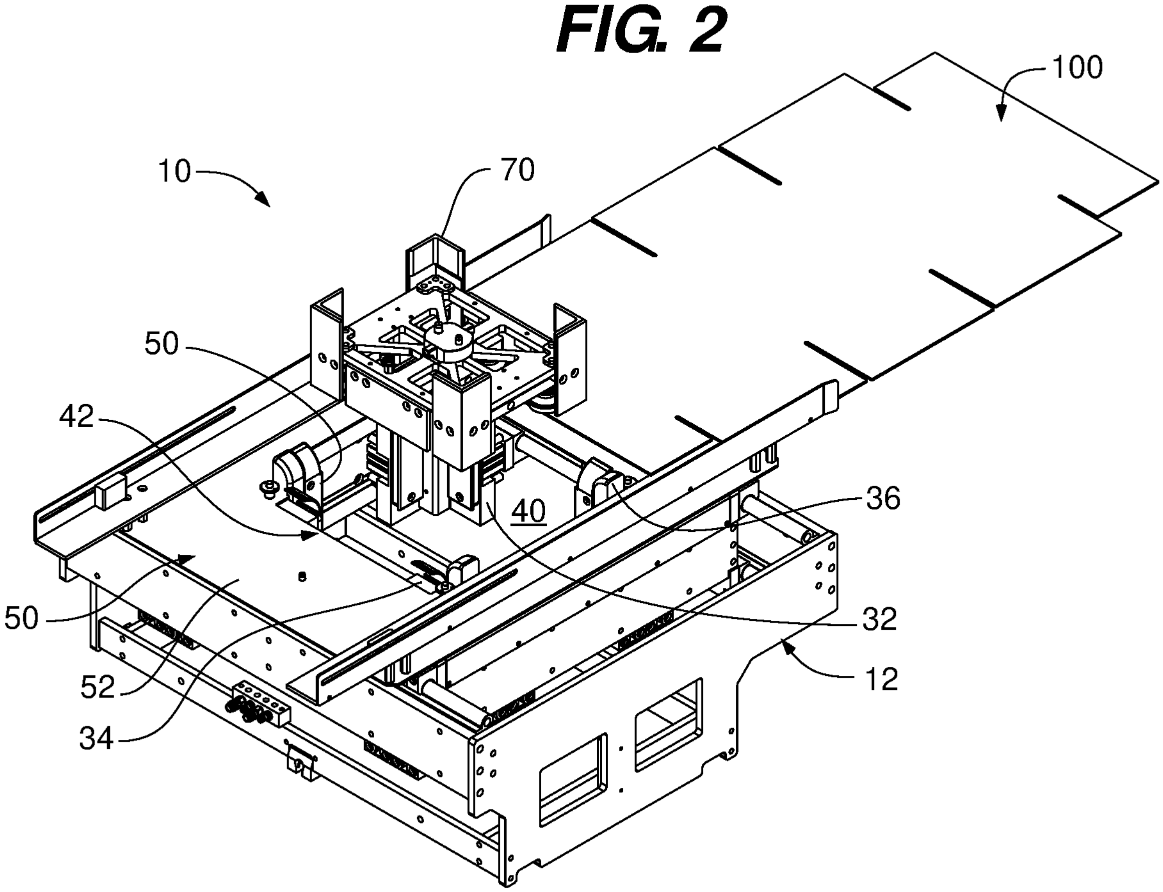
FIG. 2 is an isometric view of the assembled case former shown in FIG. 1 with the blank shown being received onto the case gage prior to case formation.
Figure 3:
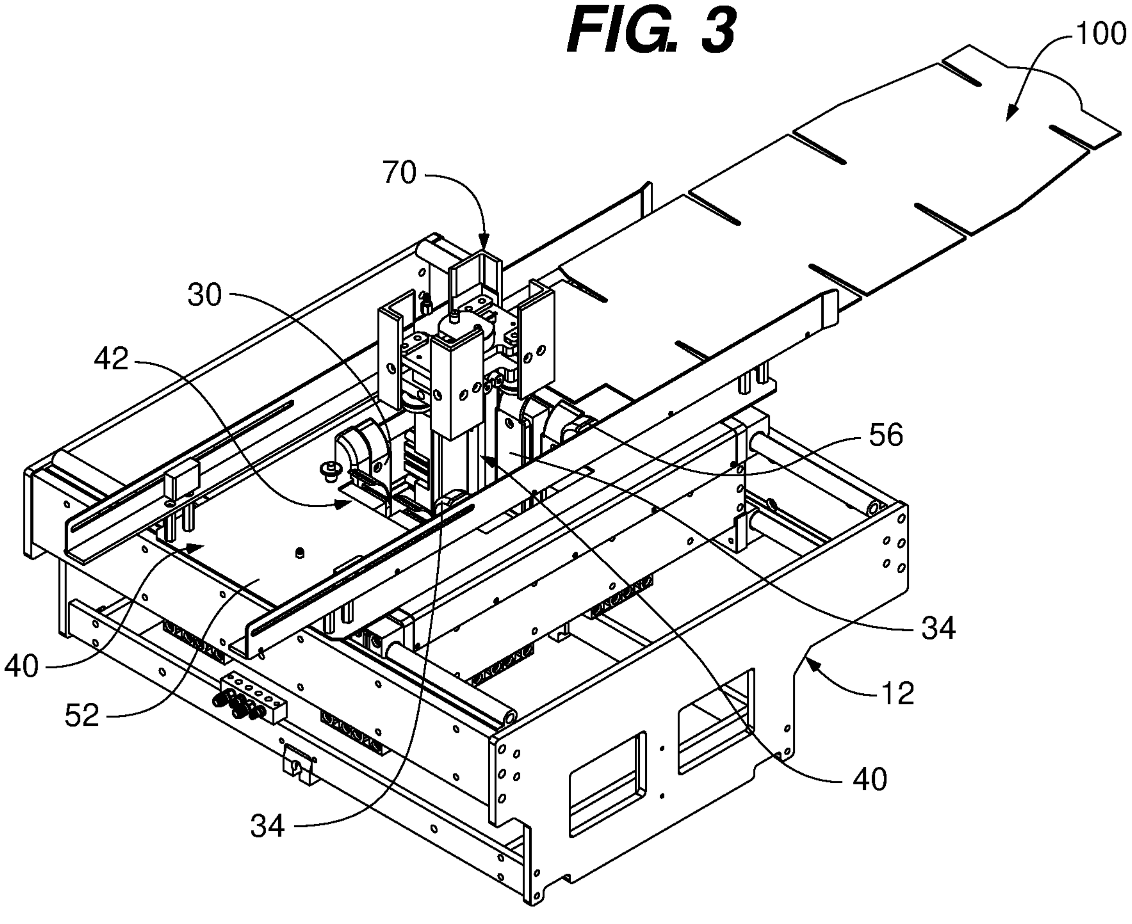
FIG. 3 is an isometric view of the case gage shown in FIG. 2 that has been reconfigured with a second type of case gage and forming head to allow the case former to receive a second type of blank.
Figure 4A:
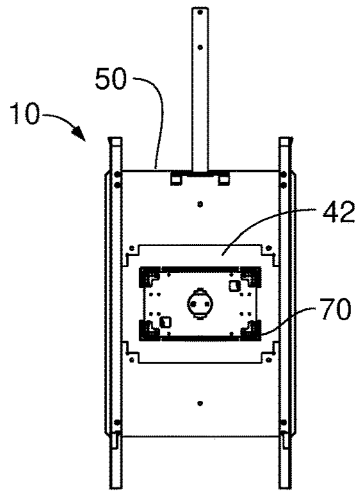
FIG. 4*a*-4*g* are top down views of exemplary case gage and forming head embodiments that maybe interchangeably used with the case former base, illustrating a sample of the variety of different template openings that a case gage may be provided with relative to correspondingly configured forming heads.
Figure 4B:
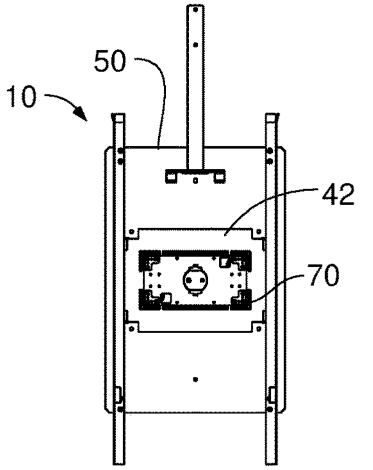
Figure 4C:
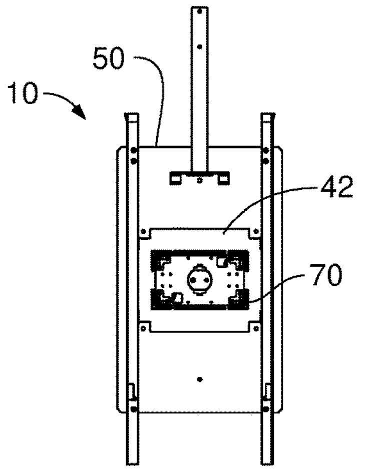
Figure 4D:
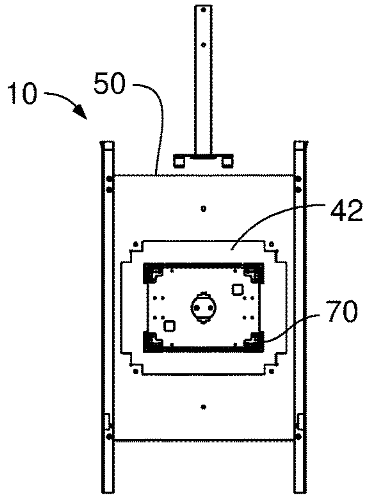
Figure 4E:
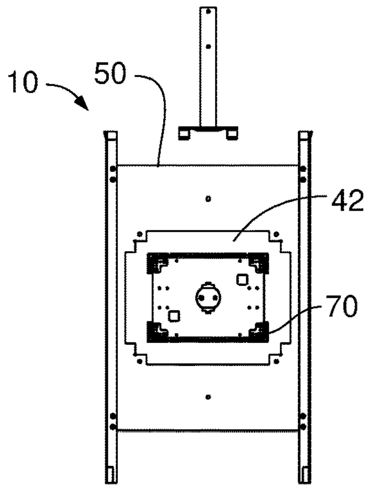
Figure 4F:
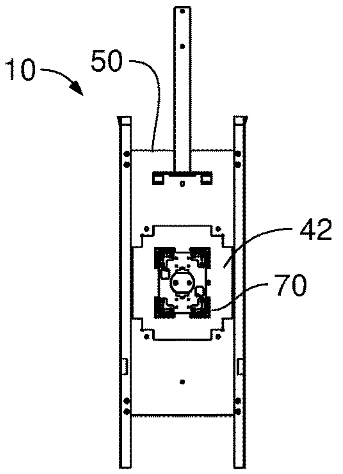
Figure 4G:
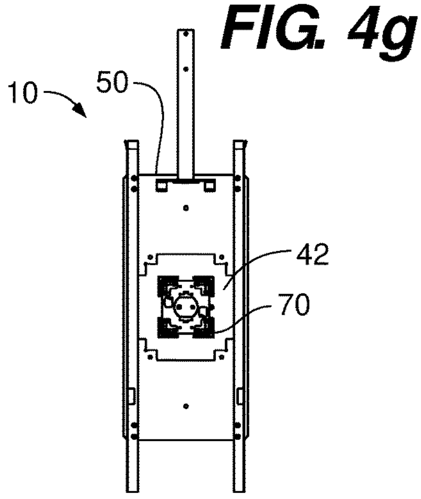

By comparing the manner in which a case former 10 may be configured in two different ways, such as is shown in FIGS. 2 and 3, the basic nature of the relationship between the template opening 42, the position of the slide blocks 30, 32, 34, and 36, and the forming head 70 is illustrated. In a first configuration shown in FIG. 2, the case former 10 is provided with a case gage 50 whose base plate 52 defines a template opening 42 such that the slide blocks 30, 32, 34, and 36 define a forming cavity 40 having a size which corresponds to that of the forming head 70. All of which have been selected to assemble a particular type of case from the blank 100 shown. The same is true of the configuration shown in FIG. 3, where it will be noted that the case gage 50 has been switched out for one whose template opening 42 is distinctly smaller in size and shape than that of the FIG. 3 configuration. The smaller template opening 42 dictates the positions of the slide blocks 30, 32, 34, and 36, which are now in much closer proximity to one another, thereby forming a forming cavity 40 of a corresponding smaller size and shape as well. The forming head 70 provided to the configuration shown in FIG. 3 is likewise, sized and shaped according to the smaller size and shape of the template opening 42, and corresponds to the formation requirements of a case that is to be formed from the very different type of blank 100, than that which is being used in configuration of FIG. 2.

As may be seen in FIGS. 4*a*-4*g*, the case former 10 may be provided with a plurality of interchangeable forming head 70 and case gage 50 configurations. In each configuration of the case gage 50, the base plate 52 may be provided with a unique template opening 42 to which the corresponding forming 70 is designed to operate with for the forming of particular types of cases.

Figure 5A:
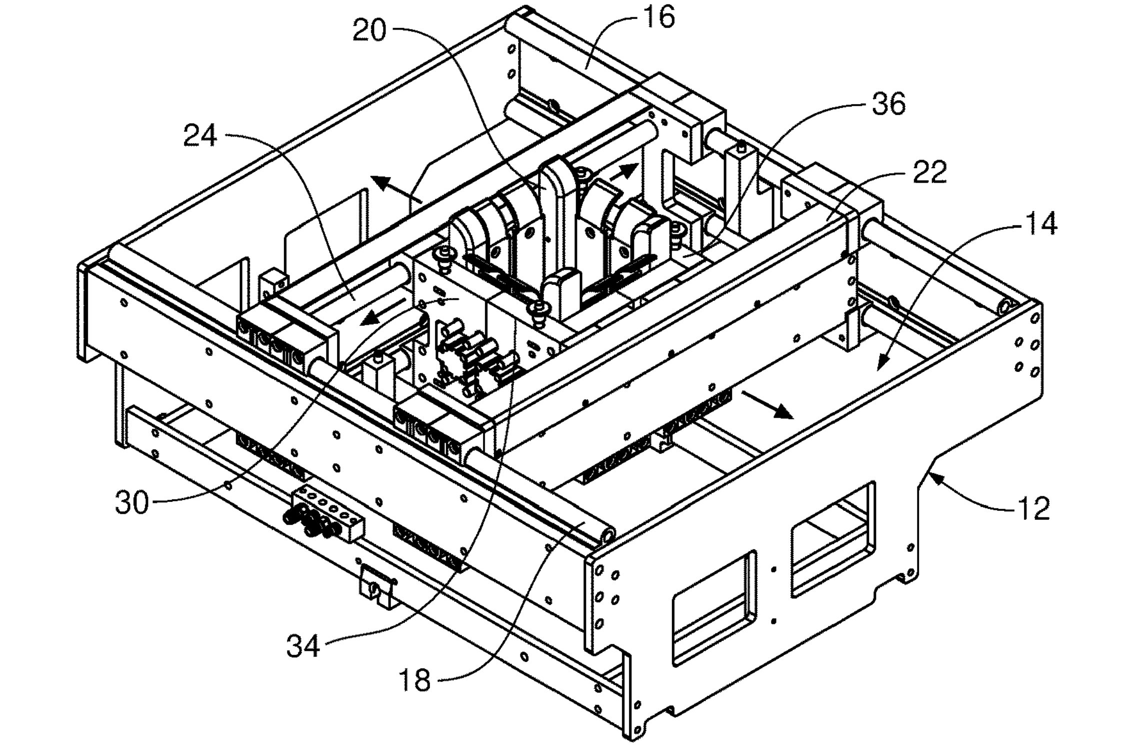
FIG. 5*a* and FIG. 5*b* are the same isometric view of the case former base shown in FIGS. 1-3 with the slide blocks shown in different positions to illustrate the manner in which the case forming cavity is reconfigured.
Figure 5B:
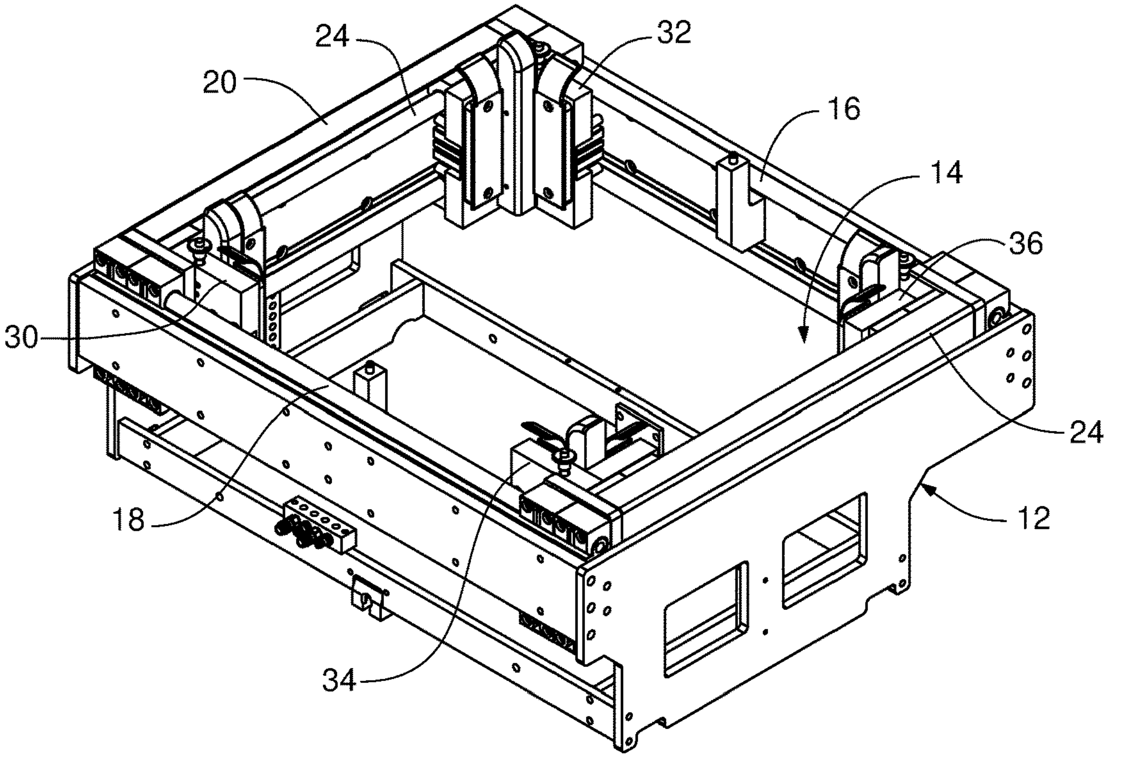

While the case gage 50, and more precisely the opening 42 defined by the base plate 52, along with a correspondingly sized and shaped forming head 70 are components that provide a basis of the customizability of the case former 10, via their ability to be readily removed and replaced on the case former 10, nevertheless, it is the uniquely reconfigurable slide blocks 30, 32, 34, and 36 within the base 12, such as are depicted in FIGS. 5*a* and 5*b*, that make the use of the various case gages 50 and forming head 70 possible.

FIGS. 5*a* and 5*b* show the interior 14 of the base 12 in two different states such as may be observed during the change over from one type of case forming run to another. Having removed the case gage 50 from atop the base 12, by first removing the locking pins 60 from slide block alignment holes SS and slide block holes 35; and then by lifting the case gage 50 from atop the base 12 and its engagement with the locating pins 46 (see FIG. 1), the interior 14 of the base 12 is made accessible. Once accessed in this manner, the slide blocks 30, 32, 34, and 36 may be moved from their previously secured position shown in FIG. 5*a* to a fully extended position such as is shown in FIG. 5*b*. This movement is accomplished by sliding each of the slide blocks 30, 32, 34, and 36 along the respective secondary rails 24 and 26 (secondary rail 26 is not visible in this view, see FIG. 1) to which they are mounted, and by likewise sliding the slide rail assemblies 20 and 24, which house the slide blocks and secondary rails, along the primary slide rails 16 and 18. The slide rail assemblies 20 and 24 and slide blocks 30, 32, 34, and 36 may then be slid into new positions within the base interior 14 to effectively reset the size and shape of the forming cavity 40, as dictated by a new case gage 50 that is placed over the slide blocks 30, 32, 34, and 36 and base 12, and then secured into place by aligning the base plate locating pin openings 54 with the locating pins 46 of the base 12 and by locking pins 60 inserted into the slide blocks 30, 32, 34, and 36 through the slide block alignment holes 55 of the base plate 52 in the manner shown in FIGS. 6 and 7.

Figure 8:
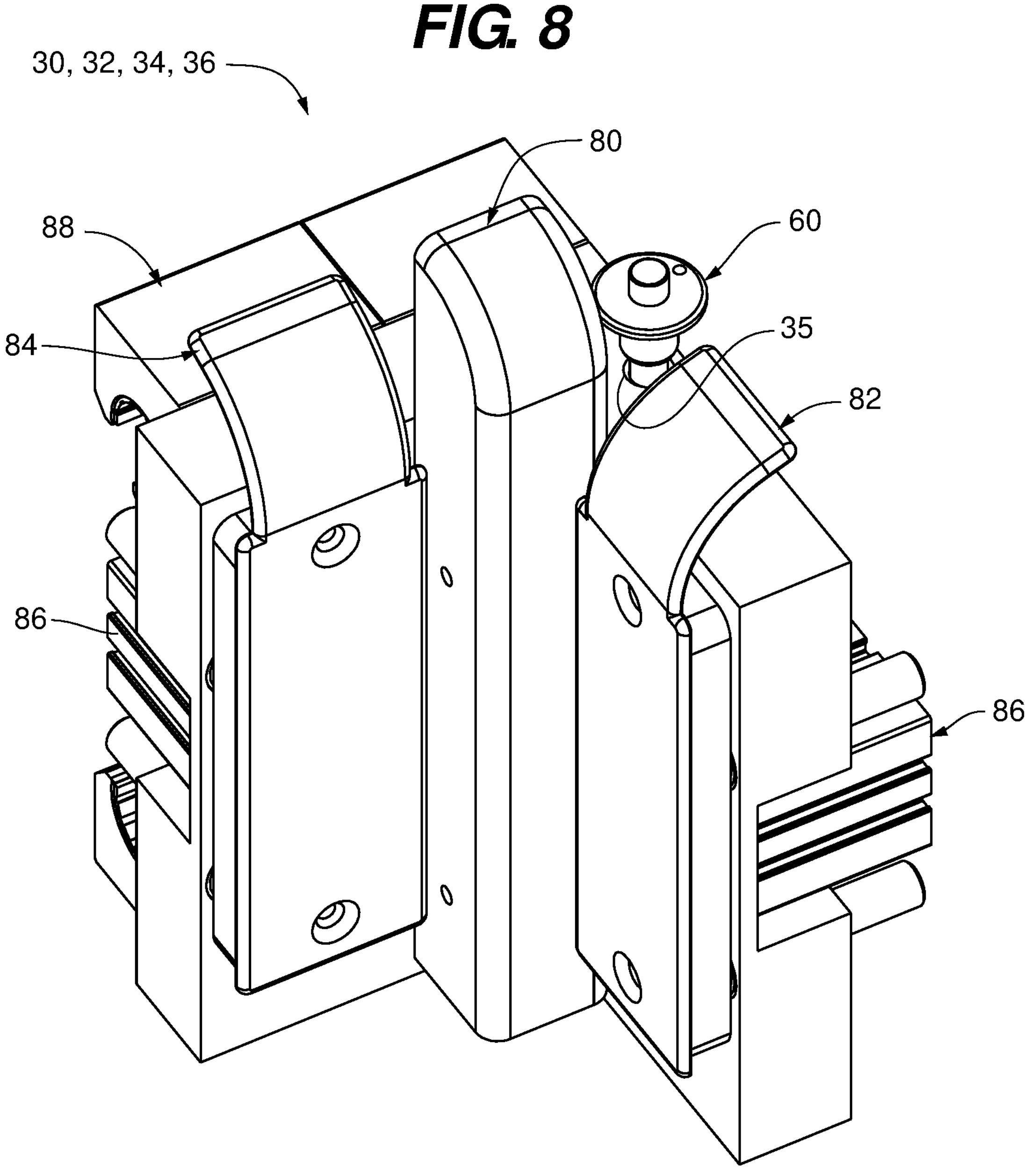
FIG. 8 is a close up view, isometric view of a slide block such as is shown in FIGS. 6 and 7.

Turning now to the features and functions of the slide blocks 30, 32, 34, and 36 themselves, a close up view of a representative slide block is shown in FIG. 8. Each slide block 30, 32, 34, and 36 is constructed in the same manner, and has the same features and functions. As is shown in FIG. 8 each slide block is comprised of a minor flap folding post 80, a first major flap folding plate 82, a second major flap folding plate 84, compression cylinders 86 and a bearing block 88. In addition, as already described above, each slide block defines a slide block hole 35 which is sized to receive a locking pin 60 in the manner shown.

The first major flap folding plate 82 and second major flap folding plate 84, are positioned on either side of the minor flap folding post 80. This intersection of post 80, and plates 82 and 84, is the defining shape of each corner of the case forming cavity 40.

The first major flap folding plate 82 and second major flap folding plate 84 are of the same height, and are both shorter than the minor flap folding post 80.

As their names suggest, the minor flap folding post 80 and major flap folding plates 82 and 84 are the aspects of the slide block that engage particular portions of the blank 100 as the forming head 70 pushes the blank 100 into the forming cavity 42 during the case forming process, such as in the manner shown in FIGS. 18-21, for example. The compression cylinders 86 are actuated during the folding process causing the first and second major flap folding plates 82 and 84 to push outward to put the major flaps of the blank 100 into compression (so as to both continue the folding process but also to set any adhesive that was applied to the blank prior to the folding process beginning). The bearing block 88 is that portion of the slide block that is slidingly engaged to the secondary slide rails (specifically the bearing block 88 of slide blocks 30 and 32 are engaged to secondary slide rail 24 of the first slide rail assembly 20; and the bearing block 88 of slide blocks 34 and 36 are engaged to secondary slide rail 26 of the second slide rail assembly 22, such as in the manner shown in FIG. 1)

Figure 6:
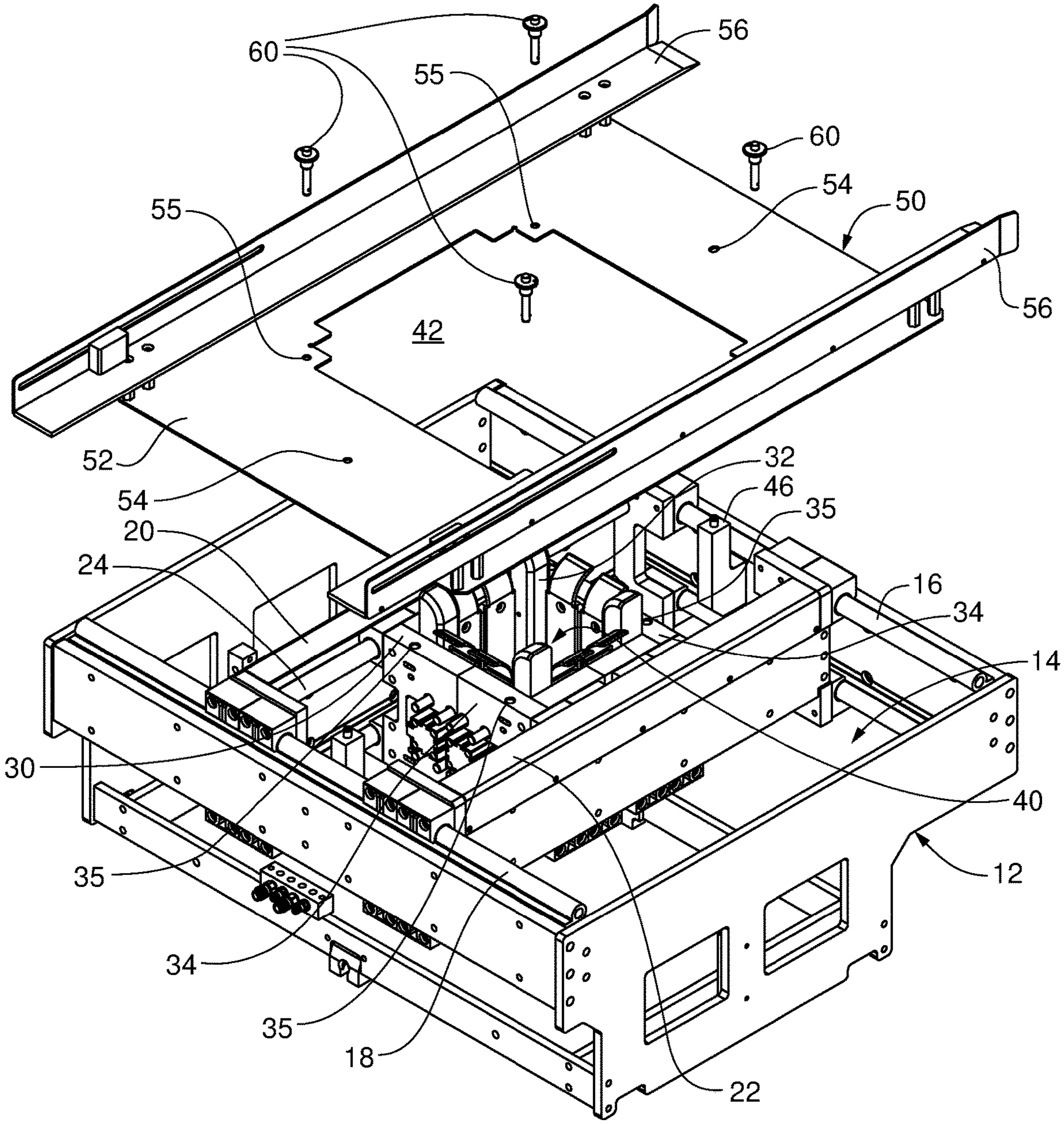
FIG. 6 is an isometric view exploded view of the case former shown in FIGS. 5*a* and 5*b*, with a case gage shown being positioned over the case forming cavity of the base and prior to being secured to the base and slide blocks.
Figure 7:
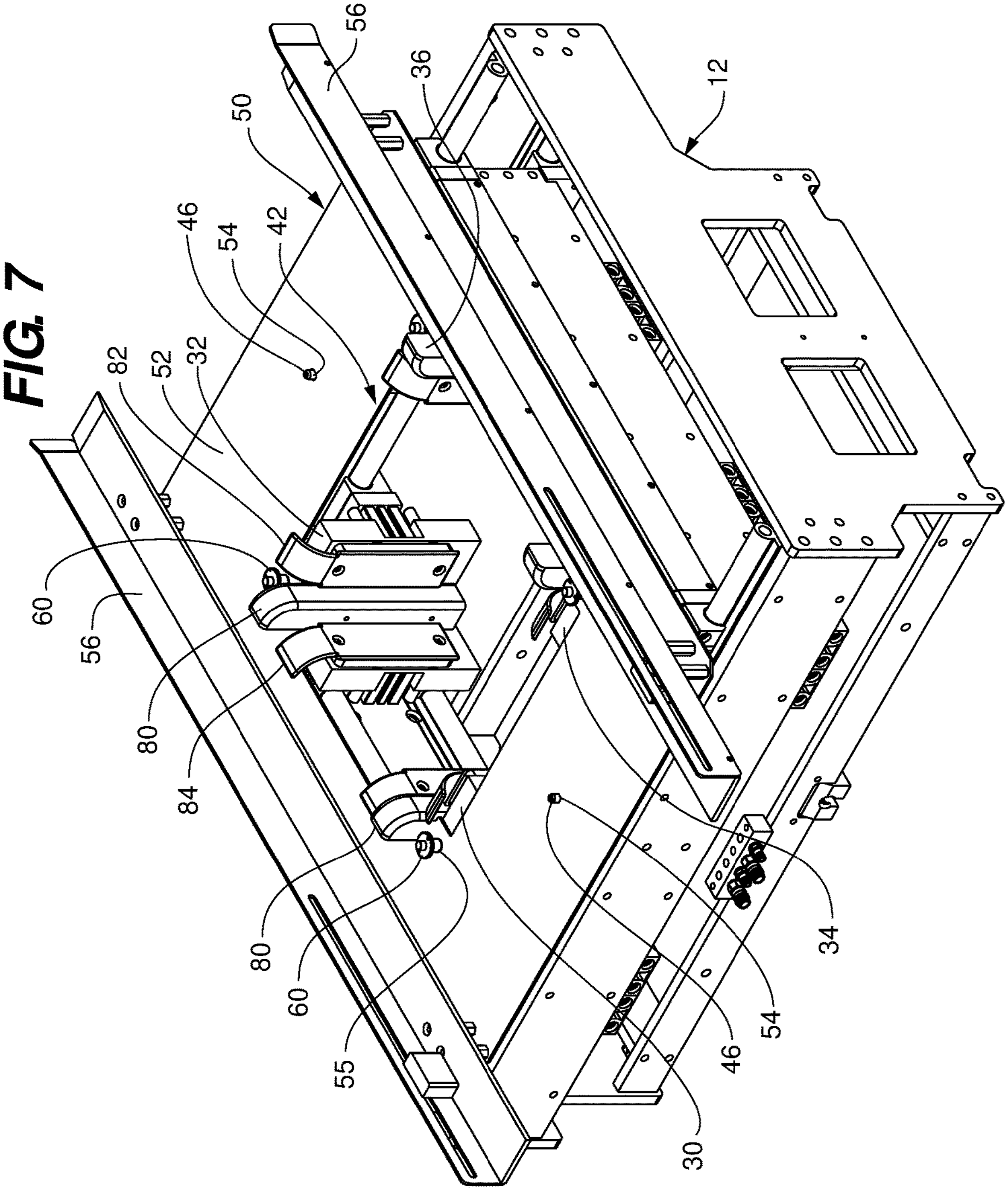
FIG. 7 is an isometric view of the case former shown in FIG. 6 with a case gage shown positioned over the case forming cavity of the base and locked to each of the slide blocks via locking pins.

As best depicted in FIGS. 6 and 7, in addition to their respective functions related to the folding of a blank into a case, the minor flap folding post 80 and major flap folding plates 82 and 84 also function as the most basic/preliminary guide to the initial installation of a new case gage 50 onto the base 12. When positioning a new case gage 50 onto the base 12, the minor flap folding post 80 and major flap folding plates 82 and 84 of each slide block 30, 32, 34, and 36 must extend partially through the template opening 42 of the base plate 52. As such, the slide blocks 30, 32, 34, and 36 may be roughly slide into position to allow the template opening 42 of the base plate 52 to be placed over all four slide blocks 30, 32, 34, and 36. Once all four slide blocks 30, 32, 34, and 36 are contained within the confines of the template opening, the case cage 50 can be manually manipulated so that the base plate locating pin openings 54 receive the locating pins 46 of the base 12.

Figure 9A:
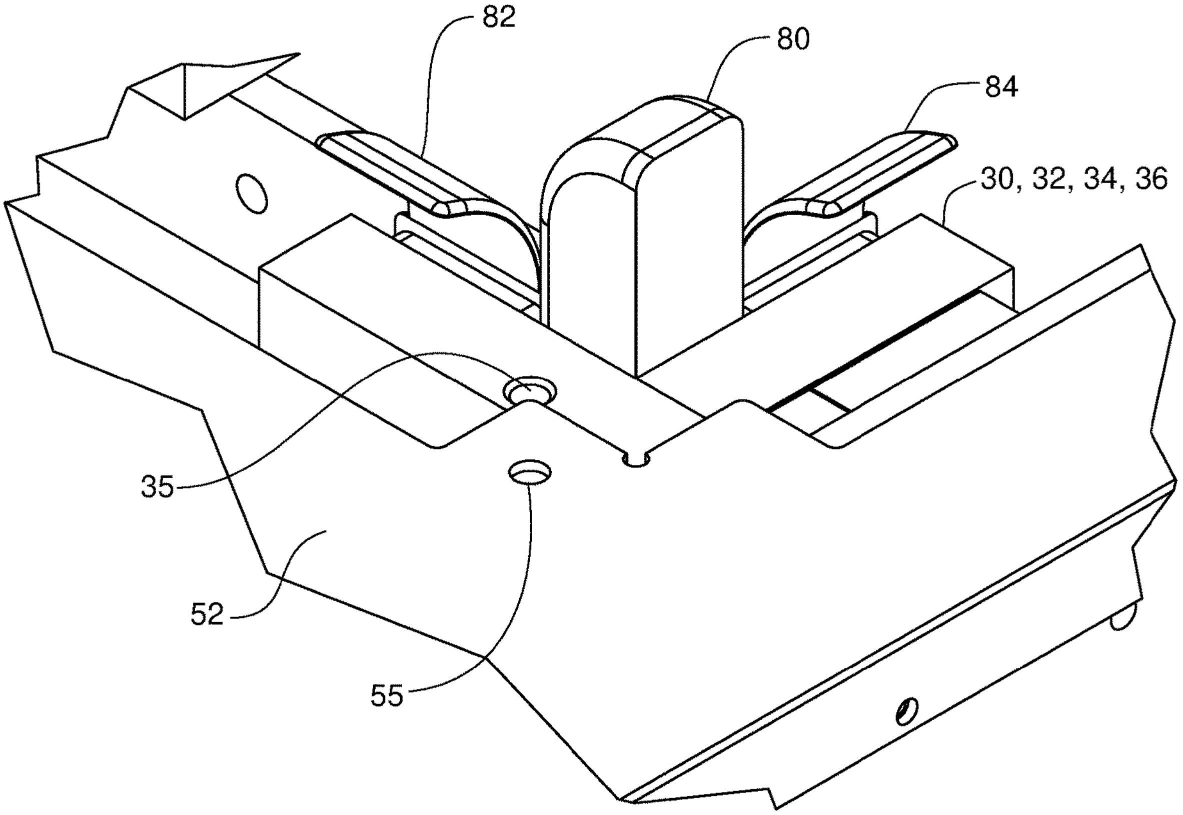
FIGS. 9*a*-9*c* are close-up, isometric views of a portion of the case gage shown in FIG. 7 and one of the slide blocks, depicted to show the manner in which a slide block is aligned with the case gage opening and locked in place to the case gage via a retaining pin.
Figure 9B:
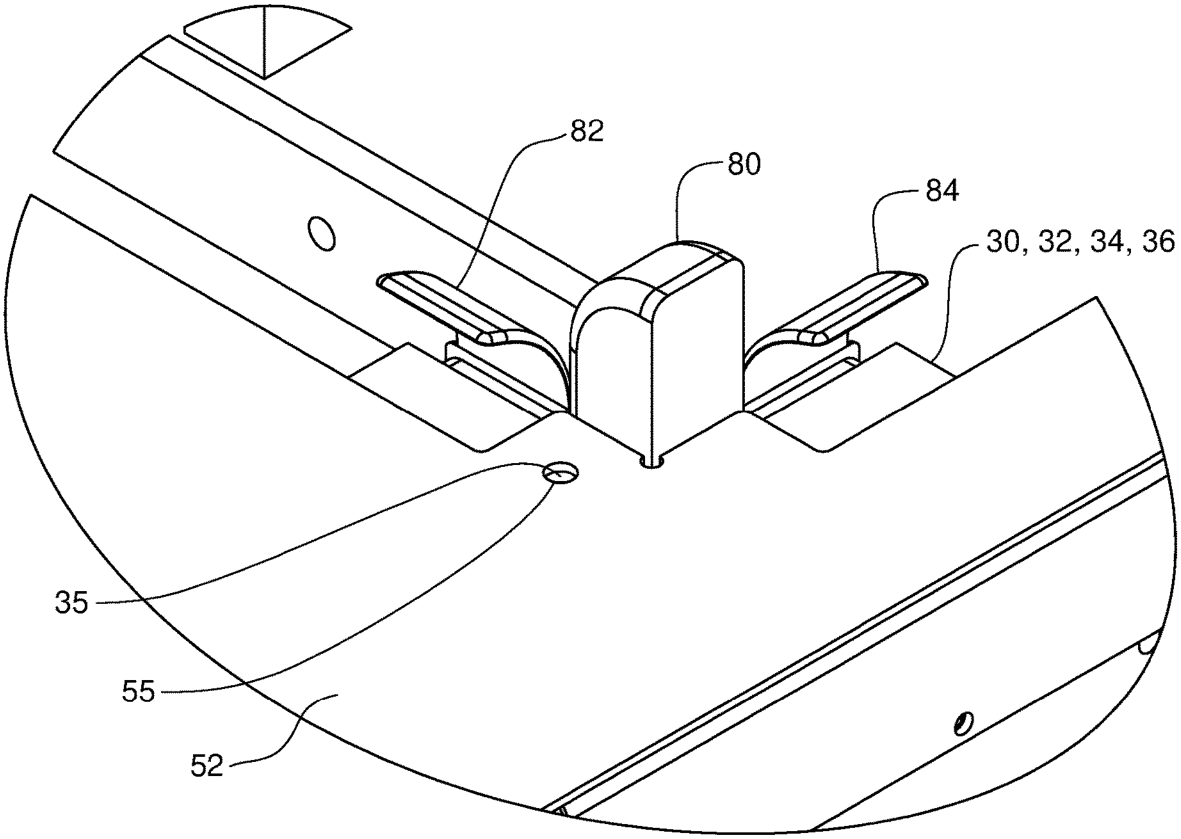
Figure 9C:
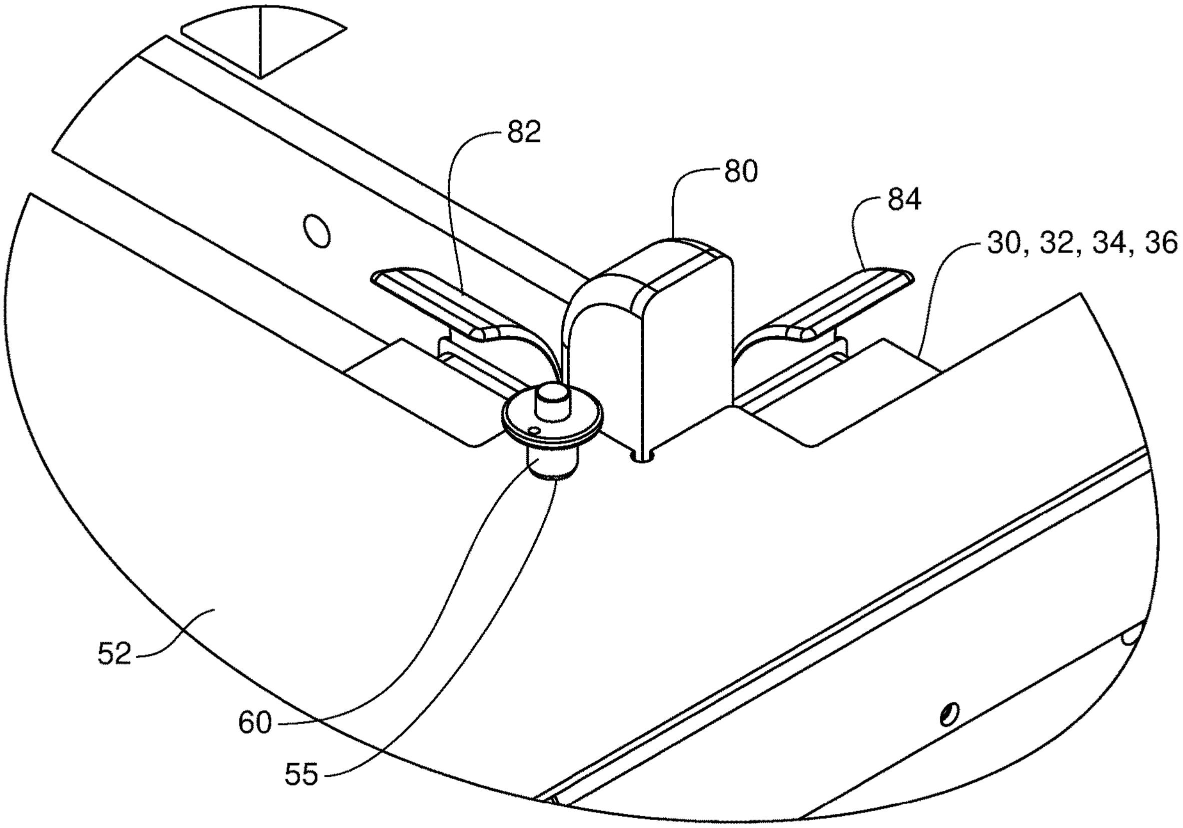

The subsequent, and more precise alignment of the slide blocks 30, 32, 34 and 36 with the template opening 42 is accomplished by sliding each slide block as necessary so that the slide block alignment holes 55 of the base plate 52 line up with the slide block holes 35 such as in the manner shown in FIGS. 9*a* and 9*b*. Once the holes 35 and 55 are in alignment, such as is shown in FIG. 9*b*, a locking pin 60, such as is shown in FIG. 9*c*, is passed through the alignment holes 55 of the base plate 52 and received into the slide block hole 35 of each slide block 30, 32, 34 and 36. In this manner, the case gage 50 is secured to each of the slide blocks 30, 32, 34, and 36 in a quick and easily repeatable manner, without sacrificing precision.

The forming head, and the posts and plates of the slide blocks, are not the only structures that contact the blank and are of significance to the case forming process. As shown in FIGS. 10-15, the side guides 56 of the case gage 52 (see FIG. 1) also have structural and functional properties that impact the blank folding and case forming process.

Figure 10:
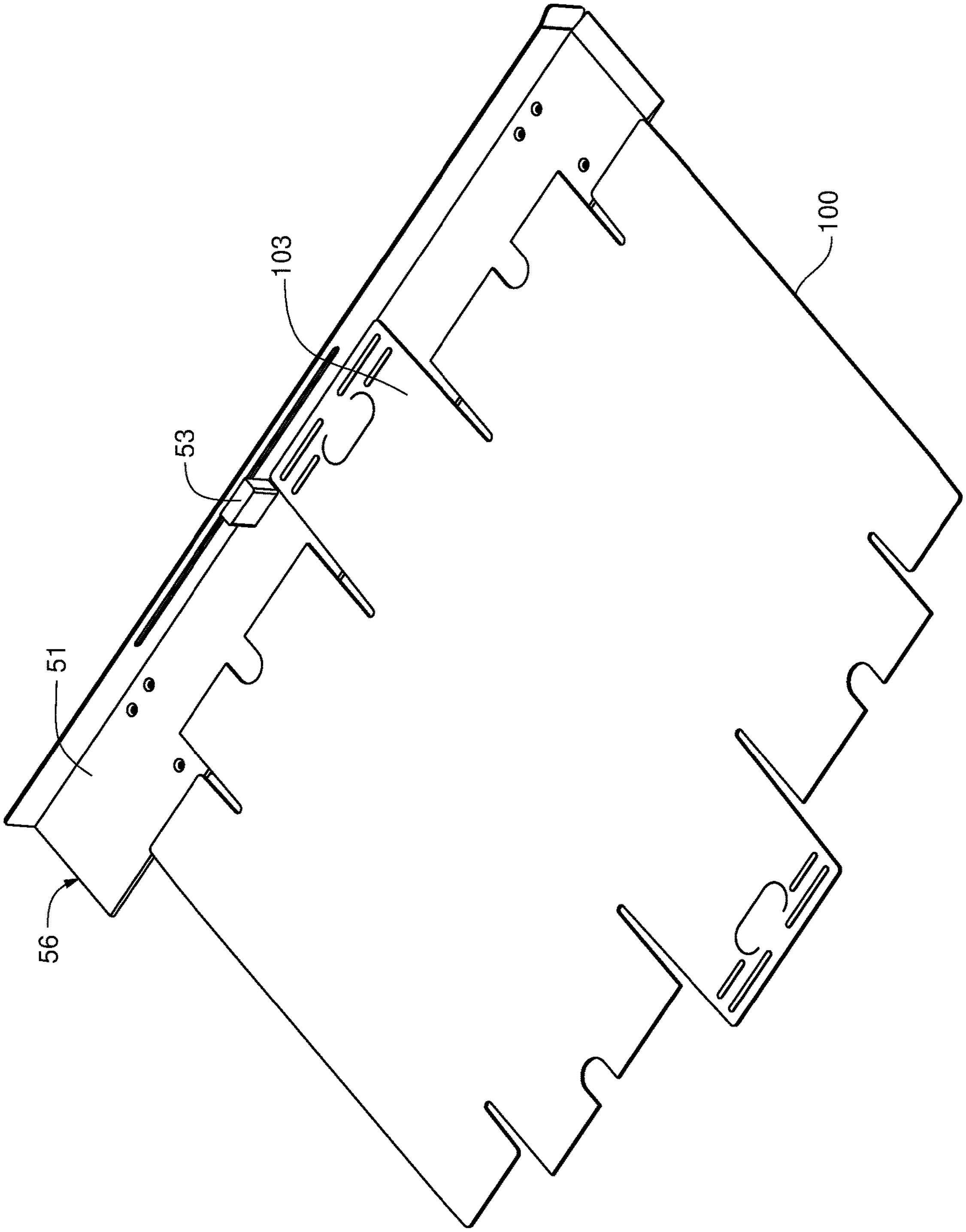
FIG. 10 is an isometric view of an exemplary side guide of a case gage depicted with a type of blank to illustrate how features of the side guide and blank potentially interact.

Beginning with FIG. 10, a side guide 56 is shown equipped with a broad support surface 51, which is useful in handling a blank 100 that has particularly large flaps 103. The side guide 56 is also equipped with a stop block 53, which acts to properly position the blank 100 over the forming cavity 40 (see FIG. 1). The stop block 53 may be repositioned along the length of the side guide 56.

Figure 11:
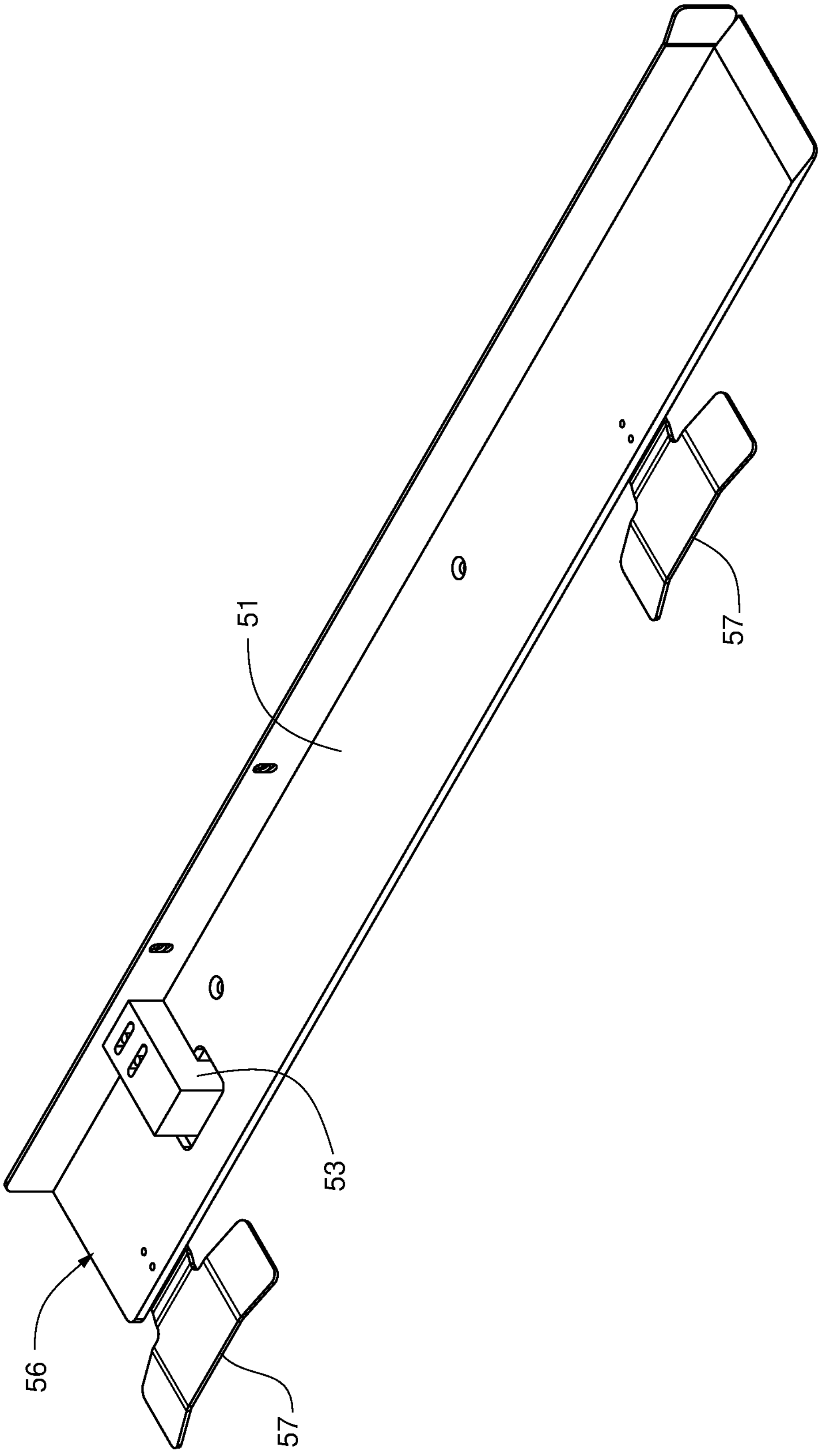
FIG. 11 is an isometric view of the exemplary side guide shown in FIG. 10 an equipped with minor support flap carriers.
Figure 12:
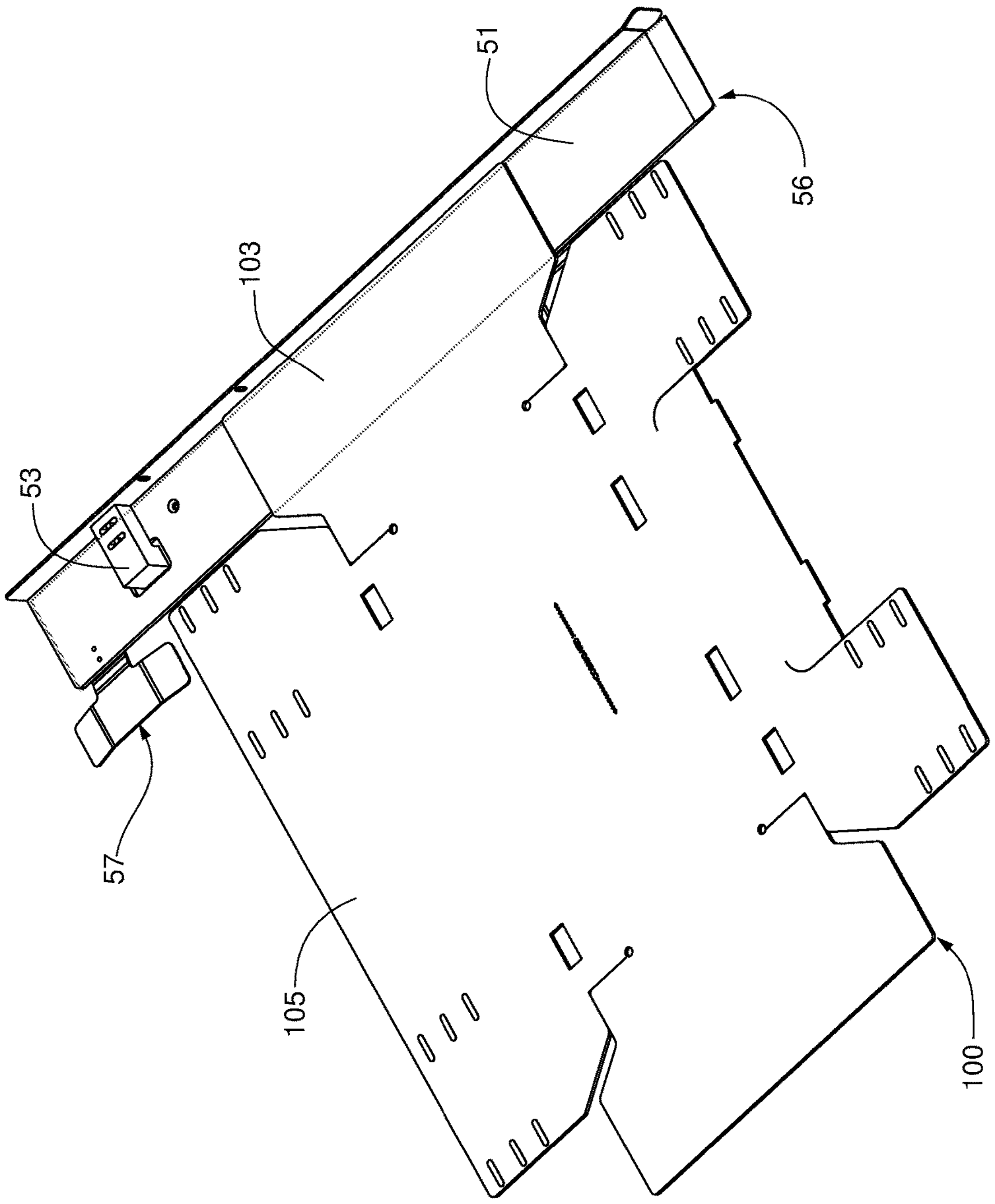
FIG. 12 is an isometric view of the exemplary side guide shown in FIG. 11 depicted with a type of blank to illustrate how features of the side guide and blank potentially interact.

Moving on to the side guide 56 embodiment shown in FIG. 11, in this embodiment the stop block 53 is in a fixed position relative to the support surface 51. The embodiment shown is provided with a one ore more convex (relative to the blank and support surface) flap support members 57, which act to catch and support particularly large minor flaps 105 that are not supported by the support surface 51 (due to the particular configuration of the blank 100), as the blank it is advanced into position along the side guide and over the case forming cavity 40 (see FIG. 1) such as in the manner shown in FIG. 12.

Figure 13:
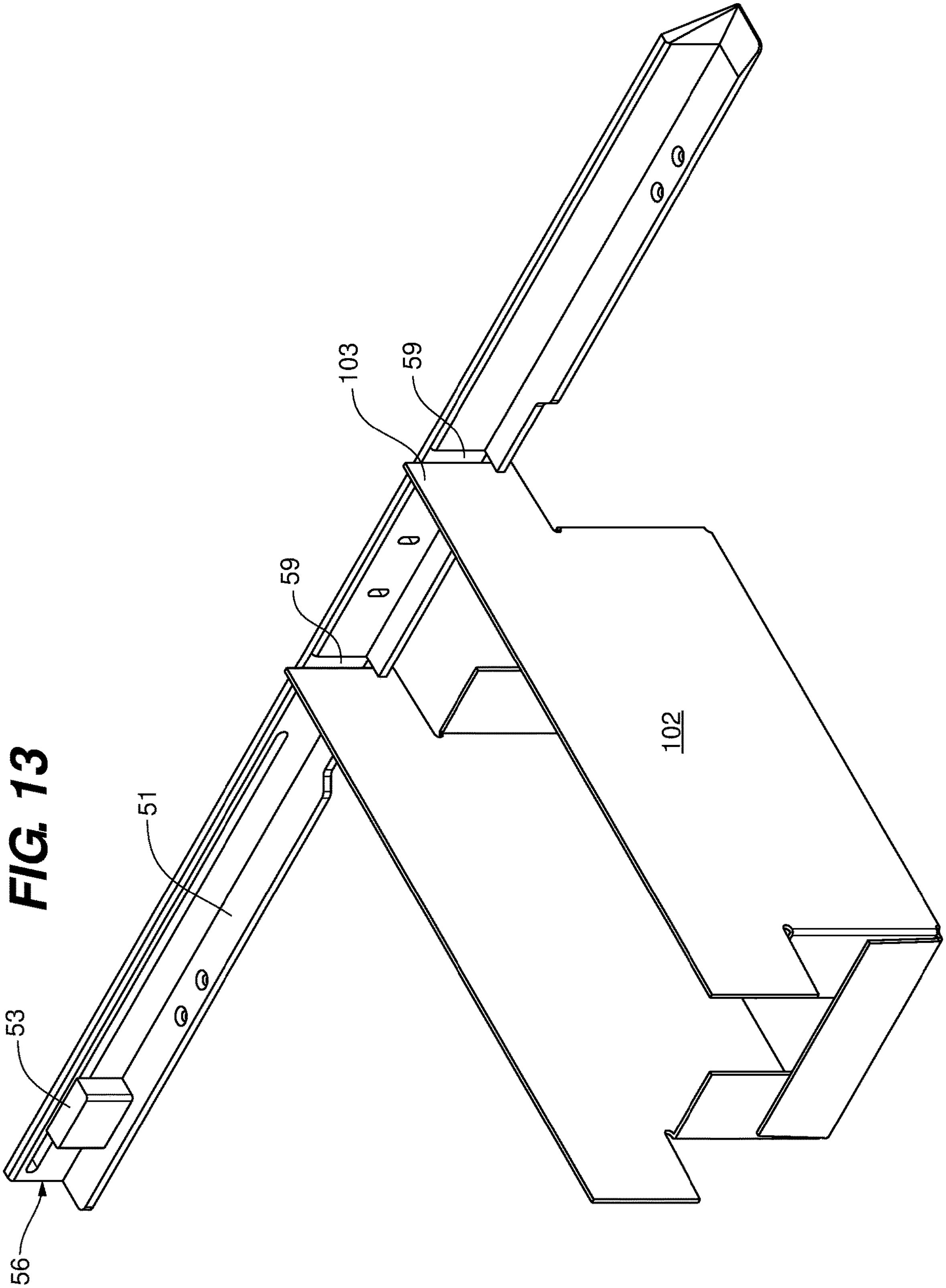
FIG. 13 is an isometric view of an exemplary side guide of a case gage depicted with a type of blank to illustrate how features of the side guide, specifically relief notches, and the blank potentially interact.

In the side guide embodiment show in FIG. 13, here the side guide 56 is provided with a pair of recesses 59 that aid in the formation of very shallow cases 102, by necessitating that the flaps 103 of the case be run through the recesses 59 such as in the manner shown.

Figure 14:
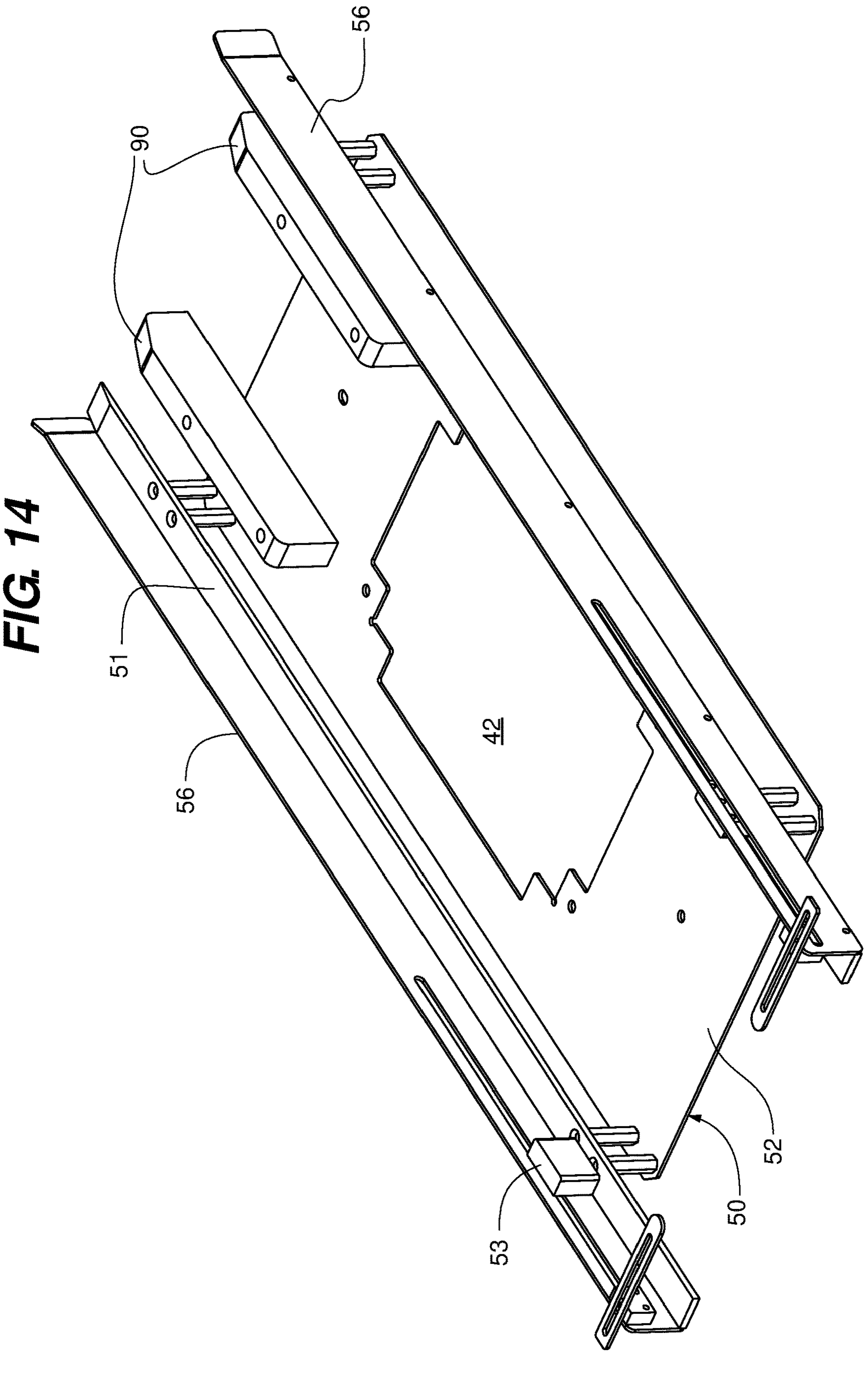
FIG. 14 is an isometric view of an exemplary case gage equipped with blank supports.
Figure 15:
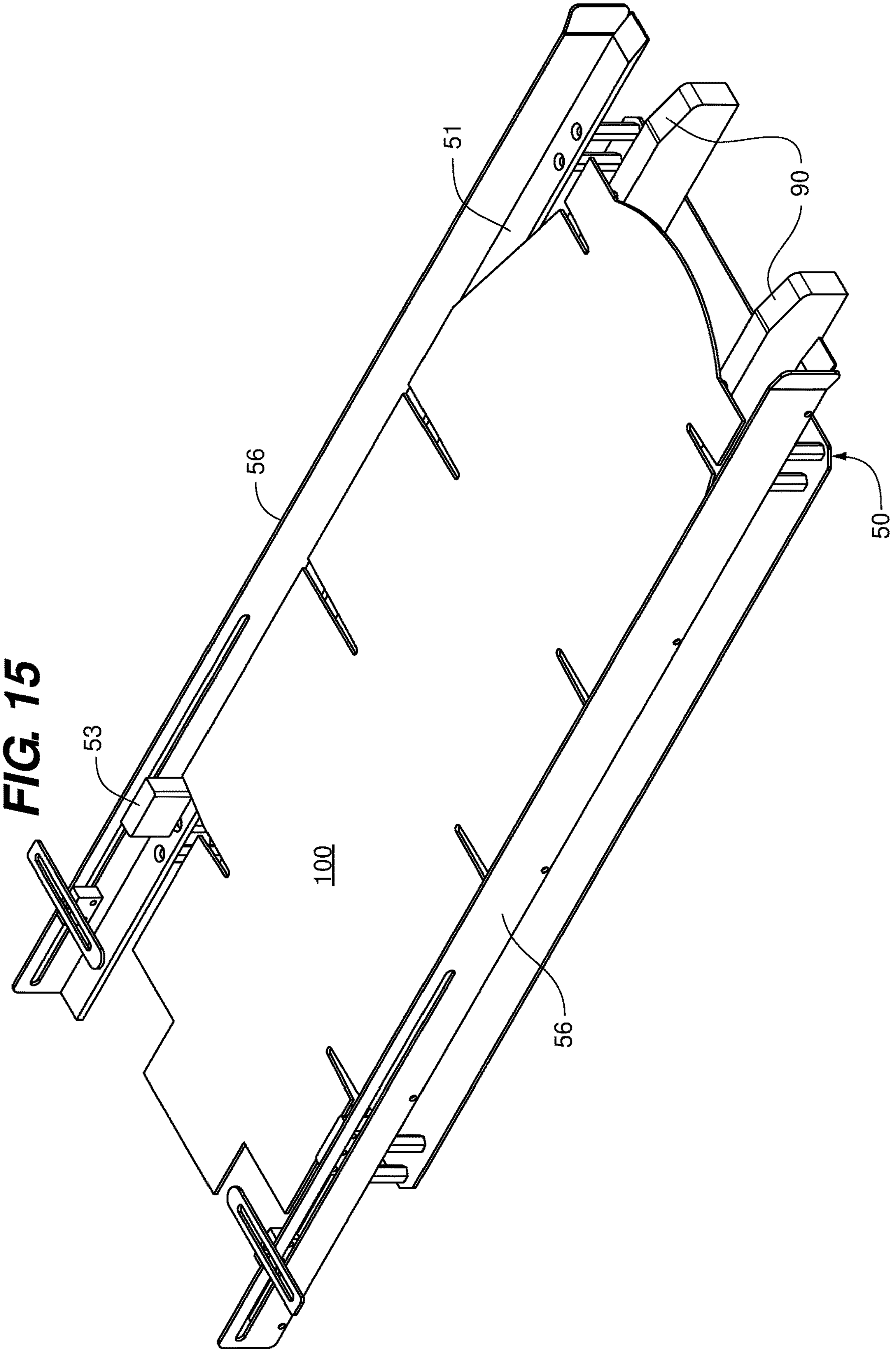
FIG. 15 is an isometric view of the case gage shown in FIG. 14 and depicted with a type of blank positioned on the case gage to illustrate the manner in which the blank supports support portions of the blank.

In the embodiment shown in FIGS. 14 and 15, rather than providing the side guides 56 with additional structures to support the blank 100, the case gage 50 is provided with blank support members 90 which act to support those portions of blanks that are not supported by the support surface 51 of the side guides 56, due to the particular configuration of the blank.

As one of ordinary skill will understand and recognize, when the case former described herein is in use, a given blank 100 may be advanced/shuttled/pushed into the former by various mechanisms. The process of forming a case from a blank 100 that has been advanced into the case former, and properly positioned over the case forming cavity 40, and under the forming head 70, via the side guides 56 is shown sequentially in FIGS. 16-19.

Figure 16:
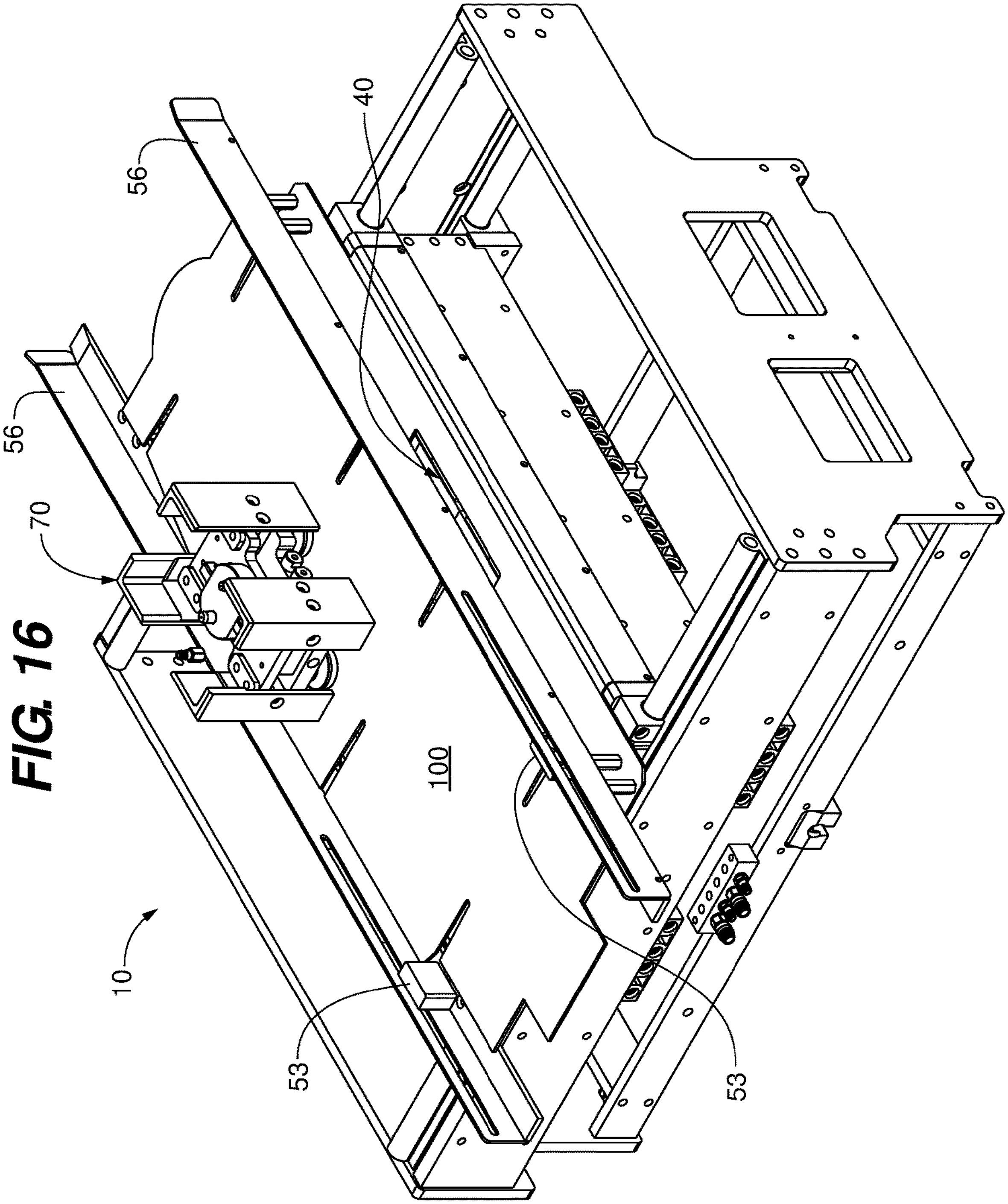
FIGS. 16-19 are a sequence of isometric views of the case former and blank showing the case forming process.

As shown in FIG. 16, the advancing blank 100 enters the former 10 by a path defined by the slide rails 56. The advancement of the blank is stopped by the stop blocks 56 which are also positioned to ensure that the blank 100 is properly aligned over the case forming cavity 40, and under the forming head 70. At or before this time, adhesive, such as hot melt adhesive, is applied to the blank at selected points of the blank surface (not shown).

Figure 17:
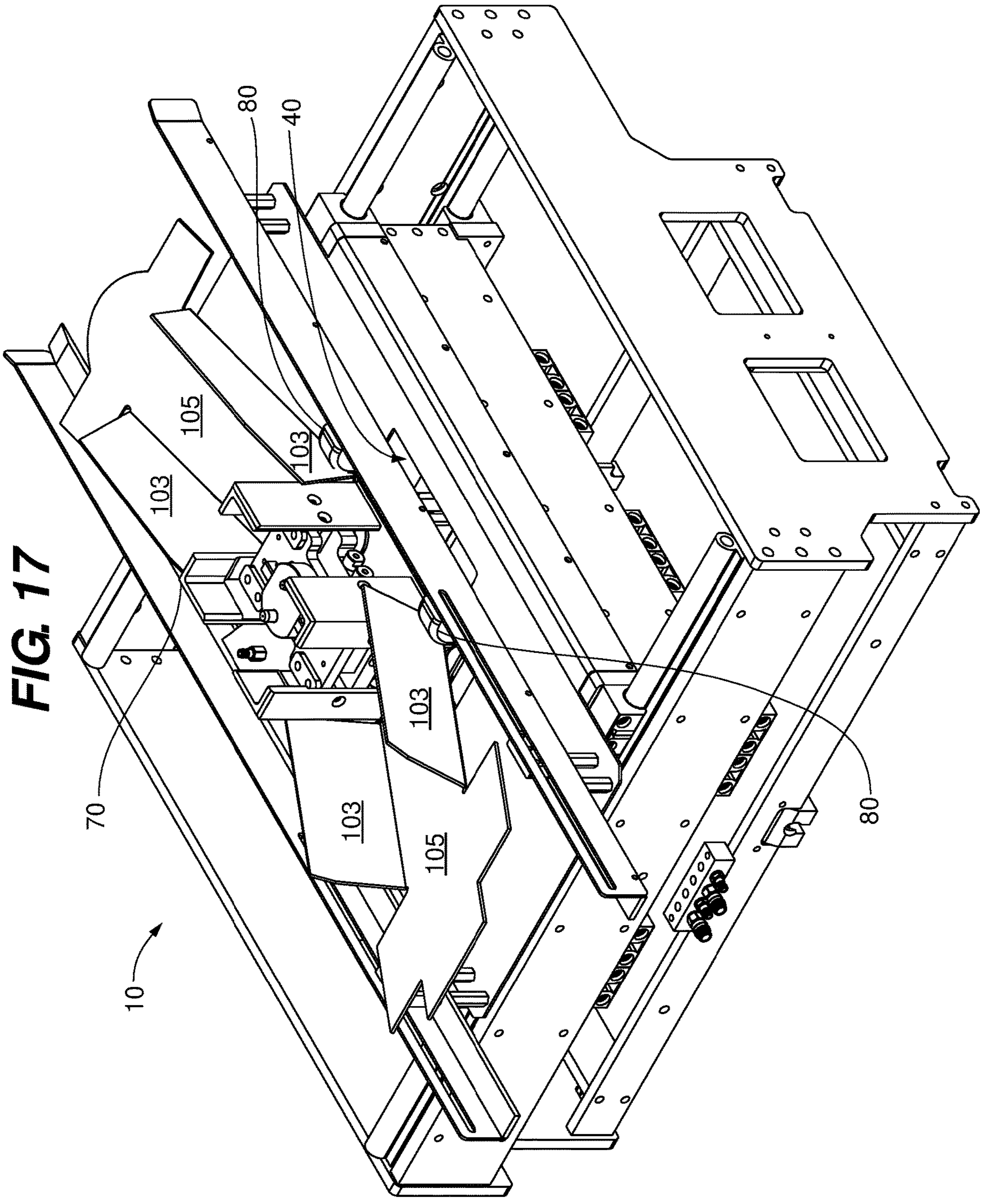

Next, as shown in FIG. 17, the forming head 70 will move down in a vertical direction (the forming head is supported and actuated by conventional means that will be recognized and understood by one of ordinary skill) whereupon it will engage the blank 100, and while applying vacuum to the blank 100, begin pushing the blank 100 into the case forming cavity 40. As this occurs, the minor flap folding post 80 is the first aspect of the slide blocks 30, 32, 34, and 36 to contact the blank 100, due to its greater height than that of the folding plates 82 and 84. Once in contact with the blank 100, the minor flap folding post 80 will exert a force on the minor flaps 103 of the blank to begin their folding prior to the folding of the major flaps 105.

Figure 18:
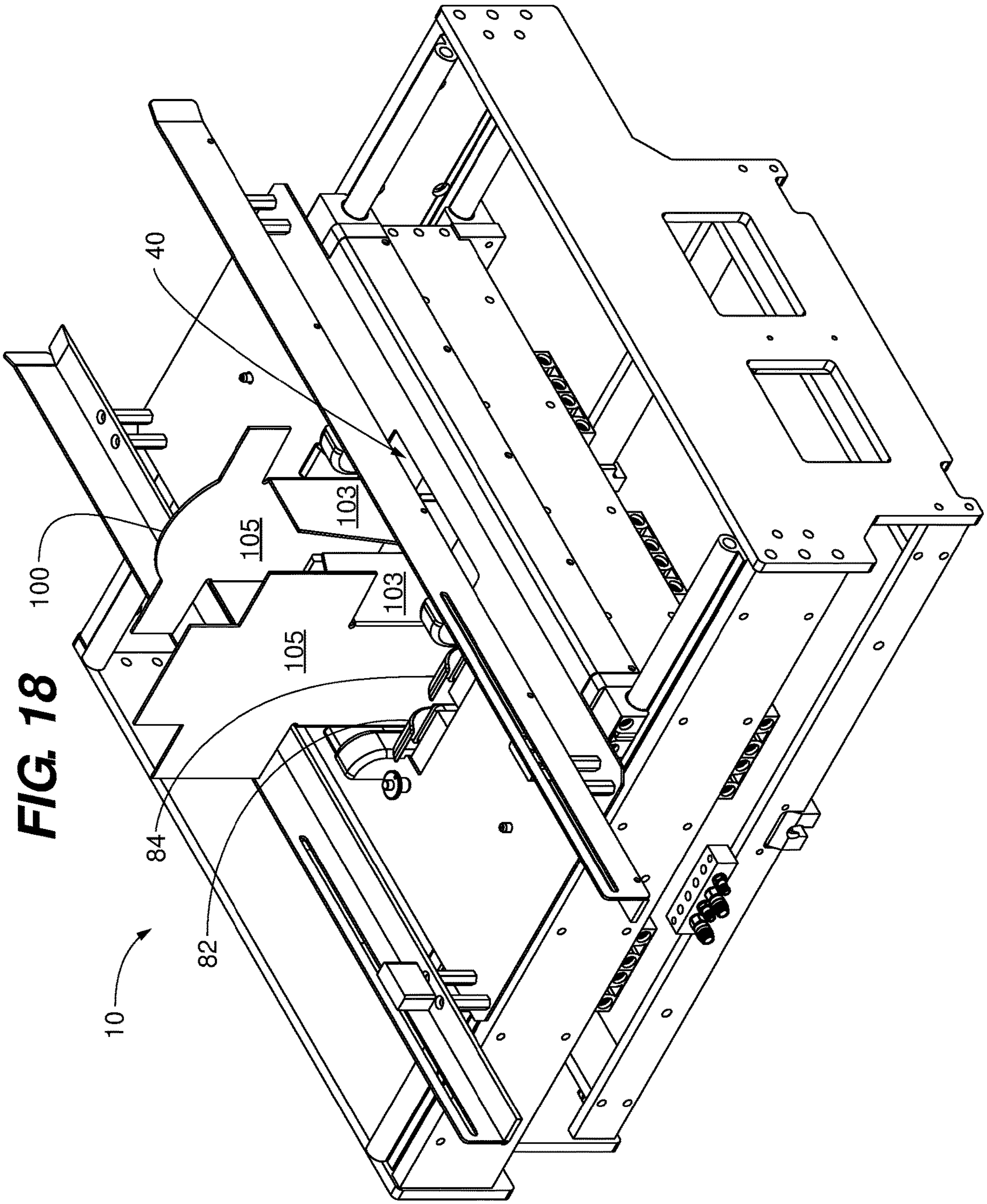

Next, as shown in FIG. 18, when the forming head (no longer visible) reaches its final forming position within the forming cavity 40, the compression cylinders 86 (see FIG. 8) are activated to actuate the first and second major flap folding plates 82 and 84 causing them to push outward and against all of the flaps 103 and 105 of the blank that are adjacent thereto, causing the overlapping layers of the blank (and any adhesive present thereon) to be compressed together.

Figure 19:
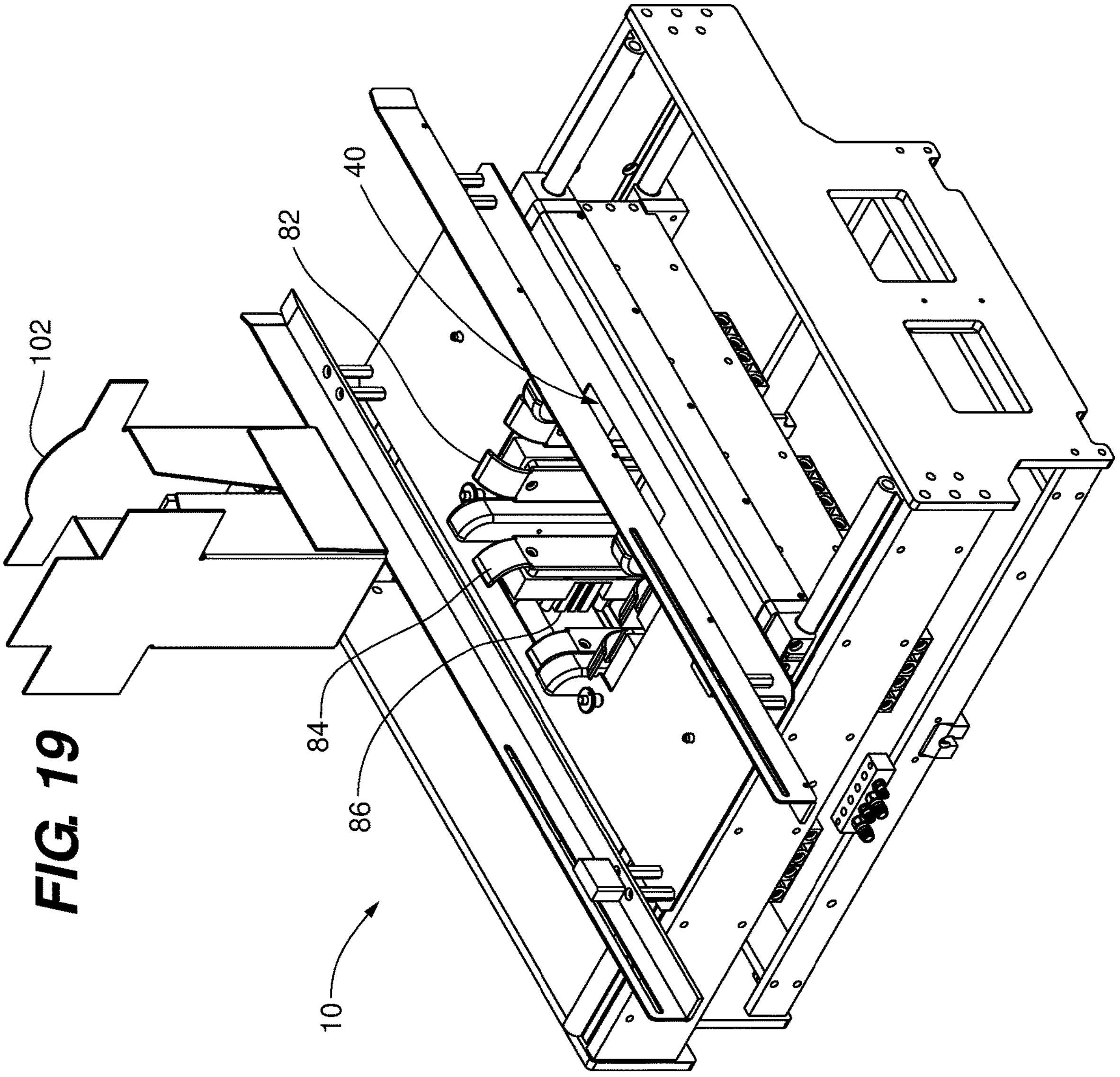

Finally, as shown in FIG. 19, after an accepted amount of time (to set any adhesive present) the compression cylinders 86 (see also FIG. 8) are deactivated, allowing the first and second major flap folding plates 82 and 84 to pull back. The forming head 60 (not visible, see FIG. 16), still applying vacuum to the newly formed case 102 is moved vertically upward from within the case forming cavity 40. Application of vacuum is ceased and the case 102 is released from the forming head and passed out of the case former 10.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A modular case forming system comprising:

a base, a plurality of case gages and a plurality of forming heads;

the base having an interior, within the interior and supported by the base is a slide rail assembly including:

at least one first slide block and at least one secondary slide block slidingly engaged to and movable upon the slide rail assembly, the at least one first slide block and the at least one secondary slide block positioned to form corners of a case forming cavity, the at least one first slide block and the at least one secondary slide block each defining a slide block hole;

each of the plurality of case gages having a base plate, and a pair of side guides mounted to the base plate, the base plate defining a template opening, the base plate further defining a plurality of slide block alignment holes, the base plate being removeably positioned over the base such that each of the side block holes is aligned with one of the plurality of slide block alignment holes;

each of the plurality of forming heads having a size and shape corresponding to a size and shape of the template opening.

2. The system of claim 1, wherein the at least one first slide block and the at least one secondary slide block each comprise a minor flap folding post, a first major flap folding plate and a second major flap folding plate, the first major flap folding plate is positioned on one side of the minor flap folding post and the second major flap folding plate is positioned on a second side of the minor flap folding post to form an intersection, the intersections define the corners of the case forming cavity.

3. The system of claim 1, wherein the slide rail assembly comprises a first slide rail assembly being slidingly engaged to and movable upon a first primary slide rail, and a second slide rail assembly being slidingly engaged to and moveable upon a second primary slide rail, the first primary slide rail is positioned on a side of the interior opposite to that of the second primary slide rail, the first slide rail assembly supporting a left secondary slide rail, the second slide rail assembly supporting a right secondary slide rail, the at least one first slide block is slidingly engaged to and movable upon the left secondary slide rail, the at least one secondary slide block is slidingly engaged to and movable upon the right secondary slide rail.

4. The system of claim 1, wherein the base plate is removeably engaged to the at least one first slide block and the at least one secondary slide block by locking pins, each of the locking pins extending through one of the plurality of slide block alignment holes and into one of the side block holes.

5. The system of claim 1, wherein the base further comprises:

a first brace and a second brace, each brace having an upwardly extending alignment pin;

the base plate further defining a first alignment hole and a second alignment hole, the base plate being removeably positioned over the base such that the alignment pin of the first brace is received by the first alignment hole, and the alignment pin of the second brace is received by the second alignment hole.

6. A modular case forming system comprising:

a base, a plurality of case gages and a plurality of forming heads;

the base having an interior, within the interior and supported by the base is a slide rail assembly including:

at least one first slide block and at least one secondary slide block slidingly engaged to and movable upon the slide rail assembly, the at least one first slide block and the at least one secondary slide block each comprise a minor flap folding post, a first major flap folding plate and a second major flap folding plate, the first major flap folding plate is positioned on one side of the minor flap folding post and the second major flap folding plate is positioned on a second side of the minor flap folding post to form an intersection, the intersections define corners of a case forming cavity, the at least one first slide block and the at least one secondary slide block each defining a slide block hole;

each of the plurality of case gages having a base plate, and a pair of side guides mounted to the base plate, the base plate defining a template opening, the base plate further defining a plurality of slide block alignment holes, the base plate being removeably positioned over the base such that a portion of each of the minor flap folding posts, a portion of each of the first major flap folding plates and a portion of each of the second major flap folding plates extend through the template opening, the at least one first slide block and the at least one secondary slide block each being positioned such that each of the side block holes is aligned with one of the plurality of slide block alignment holes;

each of the plurality of forming heads having a size and shape corresponding to a size and shape of the template opening.

7. The case former of claim 6, wherein each of the plurality of case gages is removeably engaged to the at least one first slide block and the at least one secondary slide block by locking pins, each of the locking pins extending through one of the plurality of slide block alignment holes and into one of the side block holes.

8. The case former of claim 7, wherein the base further comprises:

a first brace and a second brace, each brace defining having an upwardly extending alignment pin;

the base plate further defining a first alignment hole and a second alignment hole, the first case gage being removeably positioned over the base such that the alignment pin of the first brace is received by the first alignment hole, and the alignment pin of the second brace is received by the second alignment hole.

9. The case former of claim 6, wherein the side guides are mounted to and above the base plate via spacers.

10. The case former of claim 6, wherein the side guides comprise a support surface and a stop block.

11. The case former of claim of 10, wherein the support surface of the side guide has at least one blank support member extending therefrom, the at least one support member having a convex shape relative to the support surface.

12. The case former of claim 10, wherein the support surface defines at least one recess.

13. The case former of claim 6, wherein the first major flap folding plate and the second major flap folding plate share a common height, and the minor flap folding post has a height greater than the common height.

14. The case former of claim 13, wherein the at least one first slide block and the at least one secondary slide block each further comprise at least one compression cylinder, the at least one compression cylinder in operative communication with the first major flap folding plate and the second major flap folding plate.

* * * * *